(12) United States Patent
Abe

(10) Patent No.: US 7,525,758 B2
(45) Date of Patent: Apr. 28, 2009

(54) DISK DRIVE WITH NON-MAGNETIC COVER AND BASE PLATED WITH CONDUCTIVELY CONNECTED MAGNETIC SHIELDING LAYERS

(75) Inventor: Toshiaki Abe, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 398 days.

(21) Appl. No.: 11/477,564

(22) Filed: Jun. 30, 2006

(65) Prior Publication Data

US 2007/0002489 A1 Jan. 4, 2007

(30) Foreign Application Priority Data

Jun. 30, 2005 (JP) .............................. 2005-191999

(51) Int. Cl.
G11B 33/14 (2006.01)
G11B 5/012 (2006.01)

(52) U.S. Cl. .................................................. 360/97.02

(58) Field of Classification Search .............. 360/97.01, 360/97.02, 97.03, 98.01
See application file for complete search history.

(56) References Cited

U.S. PATENT DOCUMENTS

| | | | | |
|---|---|---|---|---|
| 5,600,509 A | * | 2/1997 | Kawakami | 360/97.02 |
| 5,654,847 A | * | 8/1997 | Yagi et al. | 360/97.02 |
| 5,666,239 A | * | 9/1997 | Pottebaum | 360/97.03 |
| 6,002,546 A | * | 12/1999 | Yagi et al. | 360/97.02 |
| 2001/0015869 A1 | * | 8/2001 | Kamezawa et al. | 360/97.01 |
| 2002/0141109 A1 | * | 10/2002 | Nguy | 360/97.02 |
| 2003/0016468 A1 | * | 1/2003 | Hayakawa et al. | 360/97.01 |
| 2003/0043499 A1 | * | 3/2003 | Shimomura et al. | 360/97.01 |

FOREIGN PATENT DOCUMENTS

| | | | |
|---|---|---|---|
| JP | 63000812 A | * | 1/1988 |
| JP | 04040691 A | * | 2/1992 |
| JP | 4-39716 U | | 4/1992 |
| JP | 08-167787 | | 6/1996 |
| JP | 2002-194586 | | 7/2002 |
| JP | 2003-077266 | | 3/2003 |
| WO | WO97/40654 | | 10/1997 |

* cited by examiner

*Primary Examiner*—Craig A Renner
(74) *Attorney, Agent, or Firm*—Pillsbury Winthrop Shaw Pittman, LLP

(57) ABSTRACT

According to one embodiment, a case of a disk device includes a plate-shaped base formed of a non-magnetic material and having an open upper surface, and a plate-shaped top cover formed of a non-magnetic material and attached to the base to cover the open upper surface of the base. An outer surface of the base is covered with a first plating layer formed of a magnetic material, and an outer surface of the top cover is covered with a second plating layer formed of a magnetic material. The first and second plating layers are conductively connected to each other. A disk-shaped recording medium and a mechanical unit are arranged in the case. The medium has a substrate, a soft magnetic backing layer formed on the substrate, and a magnetic recording layer formed so as to overlap the soft magnetic backing layer and having perpendicular magnetic anisotropy.

7 Claims, 4 Drawing Sheets

DISK DRIVE WITH NON-MAGNETIC COVER AND BASE PLATED WITH CONDUCTIVELY CONNECTED MAGNETIC SHIELDING LAYERS

CROSS-REFERENCE TO RELATED APPLICATIONS

This application is based upon and claims the benefit of priority from Japanese Patent Application No. 2005-191999, filed Jun. 30, 2005, the entire contents of which are incorporated herein by reference.

BACKGROUND

1. Field

One embodiment of the invention relates to a disk device, and more particularly, to a disk device using a recording medium of a perpendicular magnetic recording system.

2. Description of the Related Art

A disk device, for example, a magnetic disk device includes a rectangular box-shaped case. The case accommodates a magnetic disk as a magnetic recording medium, a spindle motor as drive means for supporting and rotating the magnetic disk, a plurality of magnetic heads for writing and reading out information to and from the magnetic disk, a head actuator for movably supporting the magnetic heads with respect to the magnetic disk, a voice coil motor for rotating and positioning the head actuator, a substrate unit having head ICs, and the like.

Recently, a perpendicular magnetic recording method is under development to increase a recording density. A magnetic disk device to which the perpendicular magnetic recording method is applied ordinarily includes a head disk assembly having a single magnetic pole head and a two-layered disk-shaped recording medium. The magnetic disk device is liable to be affected by the disturbance of a magnetic field from the outside, and there is confirmed a phenomenon that data recorded on the disk-shaped recording medium is deleted by the disturbance of the magnetic field. Thus, the magnetic disk device using the perpendicular magnetic recording method is required to more improve a shield function to an external magnetic field than a magnetic disk device using a conventional in-plane magnetic recording method. To fulfill the above requirement, in the disk device disclosed in Jpn. Pat. Appln. KOKAI Publication No. 2003-77266, the shield function is improved by winding a tape-shaped or foil-shaped magnetic shield material on the upper surface, the lower surface, and the side surface of a case, in particular, on a region confronting with the moving range of a magnetic head. Otherwise, there is proposed a disk device whose shield property is improved by winding a permeability steel sheet on the outer surface of a case.

However, when the tape-shaped or foil-shaped magnetic shield member or the steel sheet formed in a predetermined shape is wound on the outer surface of the case of a magnetic disk device, the reduction in thickness and size of which is required, the thickness of the device is increased in its entirety and prevents the device from being thinned. When the magnetic shield member is wound, the number of parts is increased as well as it becomes troublesome to manufacture and assemble the device, and thus manufacturing cost is increased.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a disk device comprising: a case having a plate-shaped base formed of a non-magnetic material and having an open upper surface, a plate-shaped top cover formed of a non-magnetic material and attached to the base to cover the open upper surface of the base, a first plating layer formed of a magnetic material and covering an outer surface of the base, and a second plating layer formed of a magnetic material, covering an outer surface of the top cover, and conductively connected to the first plating layer; a disk-shaped recording medium which is arranged in the case and which has a substrate, a soft magnetic backing layer formed on the substrate, and a magnetic recording layer formed so as to overlap the soft magnetic backing layer and having perpendicular magnetic anisotropy; and a mechanical unit including a head which performs information processing with respect to the recording medium, a head actuator supporting the head, and a drive motor which supports and rotates the recording medium and is disposed on the base.

A first embodiment in which the present invention is applied to an HDD will be described below in detail with reference to the drawings.

Figure 1:
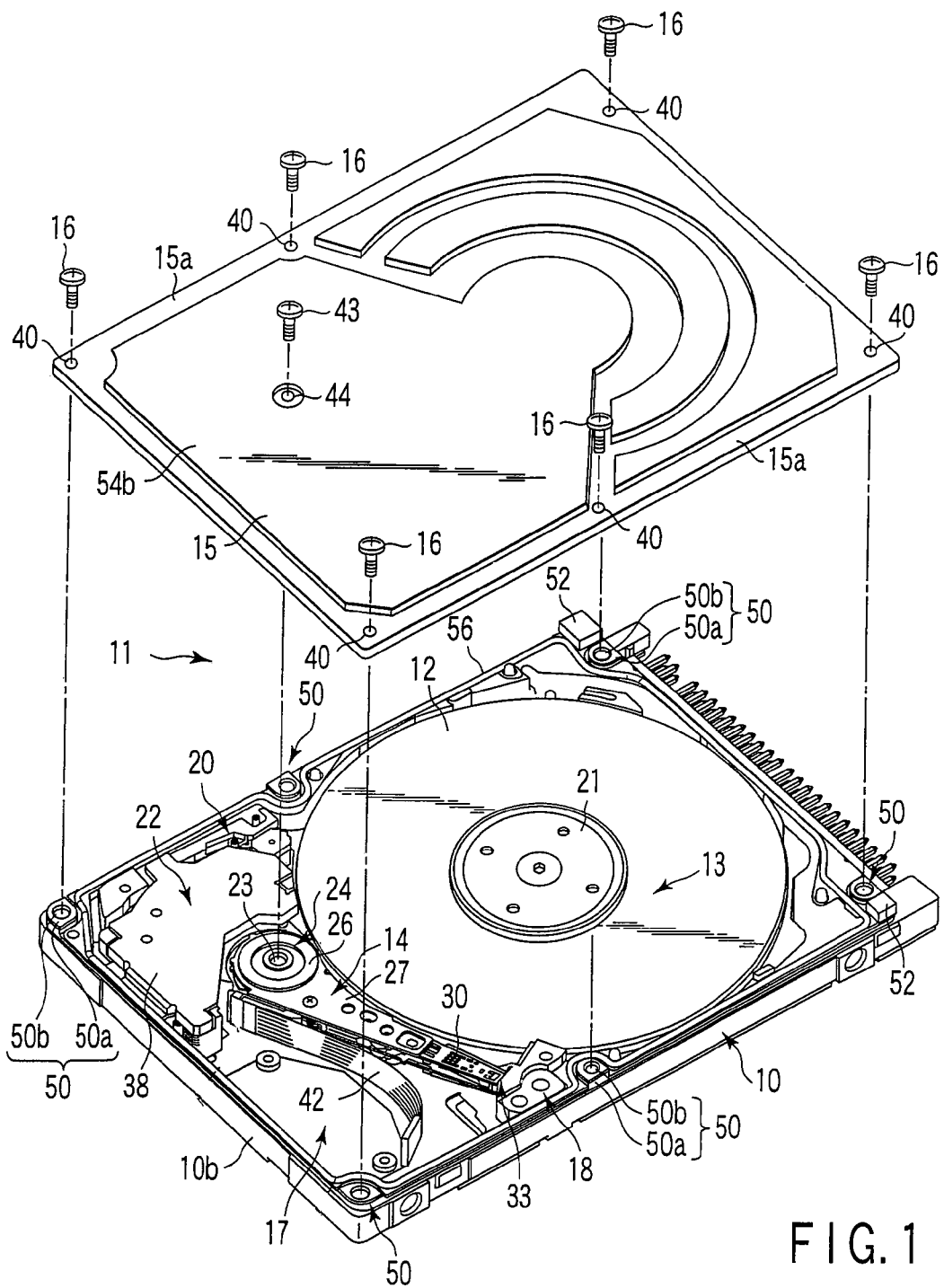
FIG. 1 is an exemplary exploded perspective view of a hard disk drive (hereinafter, referred to as "HDD") according to a first embodiment.

As shown in FIG. 1, the HDD has a case 11. The case 11 has a rectangular box-shaped base 10 having an open upper surface and a rectangular plate-shaped top cover 15. The top cover 15 is fixed to the base by a plurality of screws and closes the upper opening of the base.

A magnetic disk 12 as an information recording medium and a mechanical section are disposed in the base 10. The mechanical section includes a spindle motor 13 for supporting and rotating the magnetic disk 12, a plurality of magnetic heads 33 for recording and reproducing information to and from the magnetic disk, a head actuator 14 for movably supporting the magnetic heads 33 with respect to the magnetic disk 12, a voice coil motor (hereinafter, referred to as "VCM") 22 for rotating and positioning the head actuator, a ramp load mechanism 18 for keeping the magnetic heads at a position spaced apart from the magnetic disk when the magnetic heads move to the outermost periphery of the magnetic disk, and an inertia latch mechanism 20 for holding the head actuator at an evacuating position when a shock and the like act on the HDD. A flexible print circuit board unit (hereinafter, referred to as "FPC unit") 17, on which electronic parts such as an preamplifier and the like are mounted, is accommodated in the base 10.

A print circuit board (not shown) is fixed on the outer surface of the base 10 by screws and opposes to a bottom wall of the base 10 to control the operations of the spindle motor 13, the VCM 22, and the magnetic heads through the FPC unit 17.

The head actuator 14 includes a bearing assembly 24 fixed on the bottom wall of the base 10. The bearing assembly 24 acting as a bearing unit includes a shaft 23 standing on the bottom surface of the base 10 and a cylindrical hub 26 rotatably supported by the shaft through a pair of bearings. The head actuator 14 includes two arms 27 attached to the hub 26, two suspensions 30 extending from the respective arms, the magnetic heads 33 supported by the extending ends of the suspensions, and a plurality of spacer rings.

Figure 2:
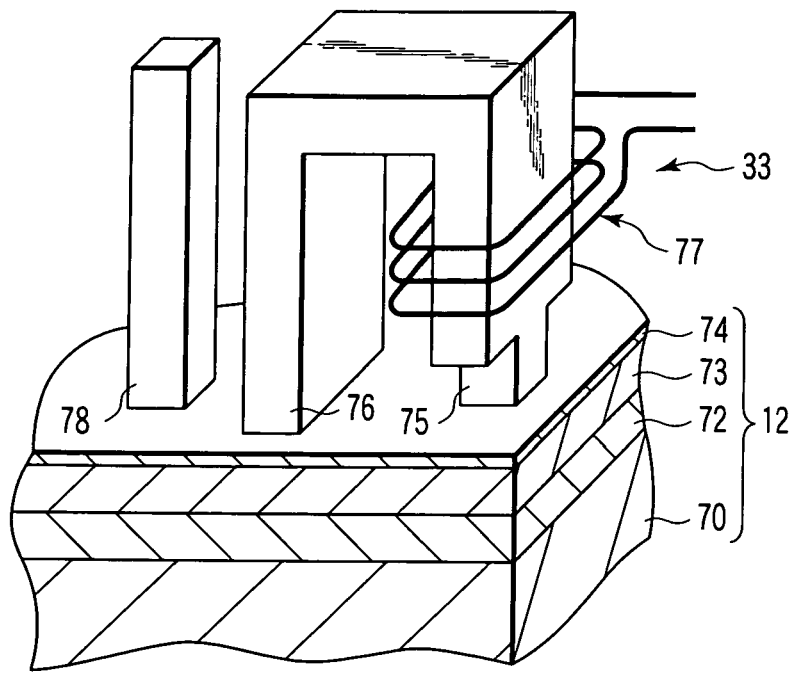
FIG. 2 is an exemplary view schematically showing a part of a magnetic head and a magnetic disk of the HDD.
Figure 3A:
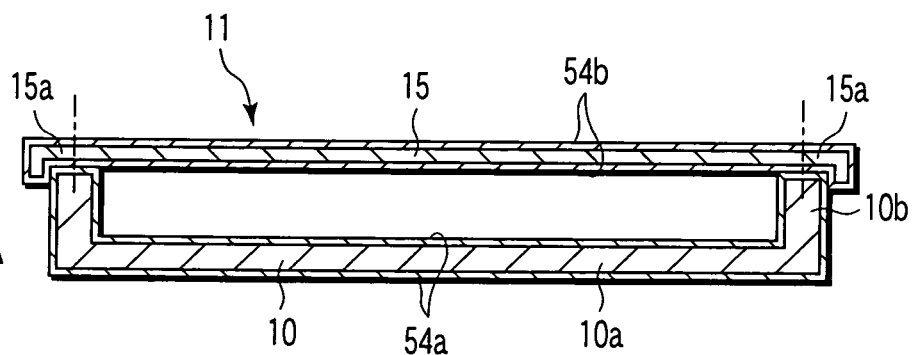
FIGS. 3A to 3C are exemplary sectional views schematically showing a case of the HDD.
Figure 3B:
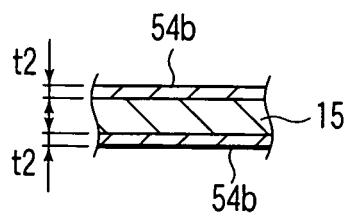
Figure 3C:
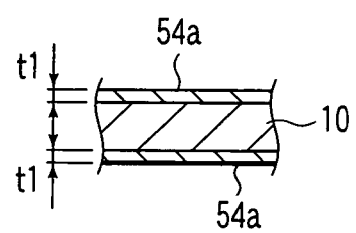

As shown in FIG. 2, the magnetic disk 12 has a diameter of, for example, 65 mm (2.5 inch). Further, the magnetic disk 12 has such a structure that a soft magnetic backing layer 72 called a soft magnetic under layer and a magnetized recording layer 73 with perpendicular magnetic anisotropy are sequentially laminated on each surface of the substrate 70 which is formed in a disk shape and composed of a non-magnetic member, and a protective layer 74 is further formed thereon.

As shown in FIG. 1, the magnetic disk 12 is coaxially fitted to a hub (not shown) of the spindle motor 13 and clamped by a clamp spring 21 so that it is fixed to the hub. The magnetic disk 12 is driven in rotation at a predetermined speed of, for example, 5400 rpm by the spindle motor 13 as a drive unit.

As shown in FIG. 2, the magnetic heads 33 are arranged as a single magnetic pole head and includes a main magnetic pole 75 for applying a recording magnetic field to the magnetic disk 12 and a return yoke 76 acting as a magnetic flux return path. A recording coil 77 is wound around the main magnetic pole 75 to excite the main magnetic pole 75 when a signal is written to the magnetic disk 12. A read head reproducing element 78 is disposed adjacent to the return yoke 76 to read out a signal from the magnetic disk 12.

As shown in FIG. 1, the respective magnetic heads 33 are fixed to gimbal sections formed on the distal ends of the suspensions 30. The respective magnetic heads 33 are electrically connected to a main FPC 42 to be described later through relay flexible print circuit boards (hereinafter, referred to as relay FPCs), respectively. The relay FPCs are bonded on the surfaces of the respective arms 27 of the head actuator 14 and on the surfaces of the suspensions 30 and extend from the distal ends of the suspensions to the rotation base ends of the arms 27. Each relay FPC is formed in a slender band shape in its entirety, and has a distal end electrically connected to each magnetic head 33 and a base end portion electrically connected to the main FPC 42. With this arrangement, the respective magnetic heads 33 are electrically connected to the FPC unit 17 through the relay FPCs and the main FPC 42.

The arms 27 fitted to the outer periphery of the hub 26 are located in parallel with each other at predetermined intervals, and the suspensions 30 and the magnetic heads 33 attached to the arms are opposite to each other. The VCM 22 includes a not shown support frame extending from the hub 26 in a direction opposite to the arms 27 and a voice coil supported by the support frame. When the head actuator 14 is assembled to the base 10, the voice coil is located between a pair of yokes 38 fixed on the base 10 and constitutes the VCM 22 together with the yokes and a magnet (not shown) fixed to one of the yokes. The head actuator 14 is rotated by energizing the voice coil, and the magnetic heads 33 move to a desired track of the magnetic disk 12 and is positioned on the track.

As shown in FIGS. 1, 3A, 3B, and 3C, the base 10 is molded of relatively light metal such as aluminum, magnesium, and the like as a non-magnetic material. The base 10 has a bottom wall 10a and a rectangular frame-shaped side wall 10b standing along the peripheral edge of the bottom wall integrally with the bottom wall 10a. Screw clamping portions 50 are formed to the extended end of the side wall 10b at the four corners and approximately the centers of the respective long sides of the side wall 10b. Each screw clamping portion 50 has a boss 50a projecting from the extended end of the side wall 10b and a threaded hole 50b formed on the flat distal end surface of the boss. The respective bosses 50a also act as abutment portions coming into contact with the top cover 15. Abutment portions 52 project from two corners of the extended end of the side wall 10b. These abutment portions 52 have flat distal end surfaces abutting against the top cover 15.

The base 10 has an inside wall located on the top cover 15 side and an outer surface exposing to the outside. At least one of the inside and outer surfaces of the base 10 is entirely covered with a first plating layer 54a formed of a magnetic material. In the embodiment, the entire surfaces of the base 10 including the inner and outer surfaces are covered with the first plating layer 54a formed of, for example, iron. The first plating layer 54a is formed to have a thickness t1 set to 30% or less of the plate thickness of the base 10, for example, to 0.05 to 0.12 μm. To prevent corrosion of the first plating layer 54a, painting, coating, and the like are applied to the outer surface of the first plating layer 54a.

As shown in FIGS. 1 and 3, the top cover 15 is formed to a rectangular shape having a size corresponding to the base 10. The top cover 15 is formed to a predetermined shape by press molding a plate member composed of relatively light metal as a non-magnetic material, for example, aluminum, magnesium, and the like and having a thickness of 0.4 mm. The top cover 15 has an inner surface located on the base 10 side and an outer surface exposing to the outside. The peripheral edge of the inner surface of the top cover 15 constitutes a flat abutment portion 15a opposing to the side wall 10b of the base 10.

At least one of the inner and outer surfaces of the top cover 15 is entirely covered with a second plating layer 54b formed of a magnetic material. In the embodiment, the entire surfaces of the top cover 15 including the inner and outer surfaces are covered with the second plating layer 54b formed of, for example, iron. The second plating layer 54b is formed to have a thickness t2 set to 30% or less of the plate thickness of the top cover 15, for example, to 0.05 to 0.1 μm. To prevent corrosion of the second plating layer 54b, painting, coating, and the like are applied to the outer surface of the second plating layer 54b.

In the abutment portion 15a, first through holes 40 are formed to the four corners and approximately the center of the side edges of a pair of long sides, respectively. The top cover 15 is fastened to the base by screwing screws 16 inserted through the respective first through holes 40 into threaded holes 50b formed on the side wall 10b of the base 10 and closes the upper end opening of the base. A gasket 56 is sandwiched between the abutment portion 15a of the top cover 15 and the extended end of the side wall 10b to keep the inside of the base 10 airtight. As shown in FIG. 1, the gasket 56 is formed in a rectangular frame shape in correspondence to the abutment portion 15a of the top cover 15. The gasket 56 is formed by sandwiching a thin metal or resin sheet between gasket members composed of, for example, rubber and the like from above and below them.

When the top cover 15 is fastened to the base 10 by the screws, the second plating layer 54b formed on the inner surface of the top cover is abutted against the abutment portions 52 and the bosses 50a formed on the side wall 10b of the base 10. At this time, the abutment portions 52 and the bosses 50a of the side wall 10b are covered with the first plating layer 54a. As a result, since the first plating layer 54a of the base 10 comes into contact with the second plating layer 54b of the top cover 15 at the positions of the abutment portions 52 and the bosses 50a, they are made magnetically conductive with each other. With this arrangement, the first plating layer 54a and the second plating layer 54b form a magnetically closed loop so as to cover members to be shielded and act as a magnetic shield.

As shown in FIG. 1, in the top cover 15, a second through hole 44 is formed at the position confronting the shaft 23 of the bearing assembly 24. A part of the top cover 15 is fastened to the shaft 23 by screwing a fixing screw 43 inserted through the second through hole 44 into the upper end portion of the shaft 23. Accordingly, the shaft 23 is supported by the base 10 and the top cover 15 of the case 11 at both ends of it. As described above, the top cover 15 has the peripherally positioned six first through holes 40 for clamping the screws and the second through hole 44 located above the shaft 23 to clamp the screw.

According to the HDD arranged as described above, the base 10 and the top cover 15 of the case 11 are formed of the relatively light non-magnetic material such as aluminum and magnesium, respectively. Accordingly, it is possible to reduce the weight of the case 11 and the HDD in their entireties. The overall outer surfaces of the base 10 and the top cover 15 are covered with the first and second plating layers 54a, 54b composed of the magnetic material such as iron. The first and second plating layers 54a, 54b are electrically conductive with each other, form the closed loop covering the inside of the case 11, and electromagnetically shield the inside of the case.

As described above, it is possible to prevent an external magnetic field from entering the inside of the case 11 from the outside by shielding the external magnetic field by the first and second plating layers 54a, 54b. Thus, since there is not a possibility that data recorded on the magnetic disk 12 is deleted by the external magnetic field, the reliability of the HDD can be improved. The writing property of the HDD can be improved by the improvement of a resistance to external magnetic field. Thus, there can be provided a high density recording magnetic disk device of a perpendicular magnetic recording method with high reliability. Further, since it is not necessary to wind a magnetic shield material and the like on the outer surface of the case 11, the number of parts can be reduced and an assembly property can be improved.

Since the first and second plating layers 54a, 54b are formed very thin, a magnetic shield effect can be obtained without greatly increasing the dimension of the case 11. As a result, it is possible to further reduce the thickness of the device in its entirety. Since the first and second plating layers 54a, 54b are strongly coupled with the base 10 and the top cover 15, the base 10 and the top cover 15 can be easily handled when they are assembled.

Since the first and second plating layers are formed after the base 10 and the top cover 15 are molded, the plating layers can be evenly formed even if the base and the top cover have a complicated shape. Further, since the base 10 and the top cover 15 are covered with the first and second plating layers 54a, 54b composed of iron, respectively, it is possible to improve the mechanical strength of parts and the strength of the HDD in its entirety.

Next, an HDD according to a second embodiment of the present invention will be explained.

A permeability material, that is, a magnetic material having a larger thickness can more improve a magnetic shield effect. In the first embodiment described above, the plating layers having the uniform thickness t1 or t2 are entirely formed to the outer and inner surfaces of the base 10 and to the outer and inner surfaces of the top cover 15. In this case, although the total thickness of the plating layers formed on the outer and inner surfaces is t1×2 or t2×2, the thickness of the plating layer acting as a path of magnetism is t1 or t2.

Figure 4A:
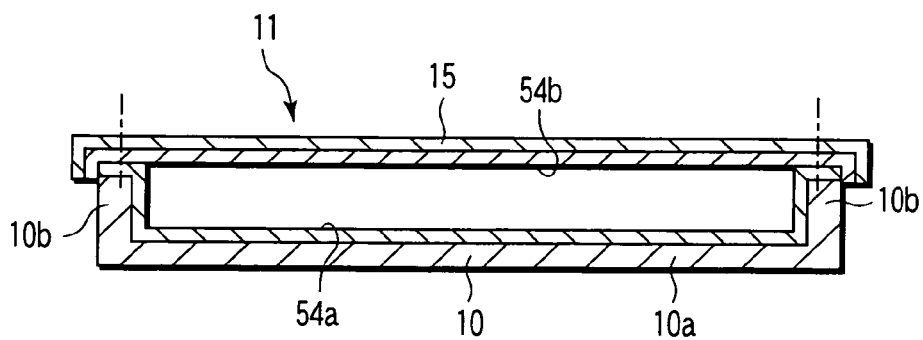
FIGS. 4A to 4C are exemplary sectional views schematically showing a case of an HDD according to a second embodiment of the present invention.
Figure 4B:
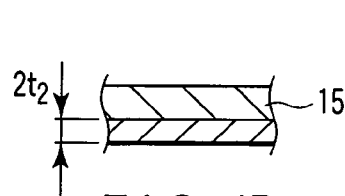
Figure 4C:
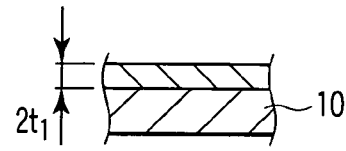

According to the second embodiment, the first and second plating layers are arranged as partly plating layers and formed on a part of the base 10 and a part of the top cover 15 as shown in FIGS. 4A, 4B, and 4C. That is, the first plating layer 54a is formed only on the inner surface of the base 10 to a thickness of 2t1. Here, the inner surface of the base 10 includes the extended end surface of a side wall 10b. The second plating layer 54b is formed only on the inner surface of the top cover 15 to a thickness 2t2.

Figure 5:
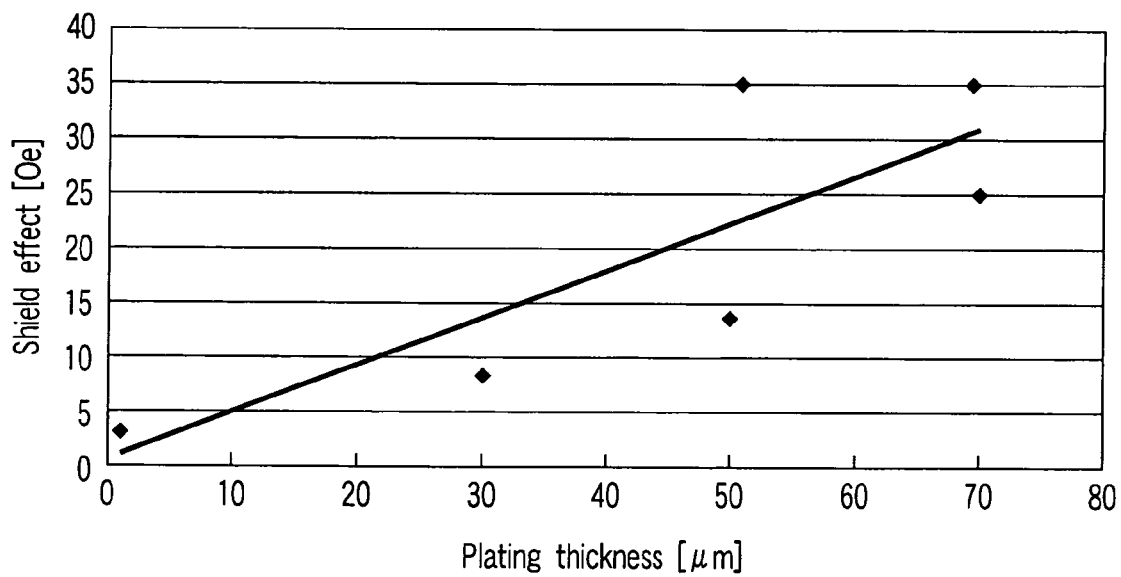
FIG. 5 is an exemplary graph showing the relation between the thickness of a plating layer and a magnetic shield effect.

According to this arrangement, when it is assumed that the thickness of the first plating layer 54a and the thickness of the second plating layer 54b are the same as those of the first embodiment, the thickness of the first plating layer and the thickness of the second plating layer acting as a path of magnetism are twice those of the first embodiment. As a result, it is possible to improve the magnetic shield effect. FIG. 5 shows the relation between the thickness of a plating layer and a magnetic shield effect (intensity of magnetic field). It can be found also from the graph that the shield effect can be more improved by an increase of the thickness of the plating layer.

Figure 6:
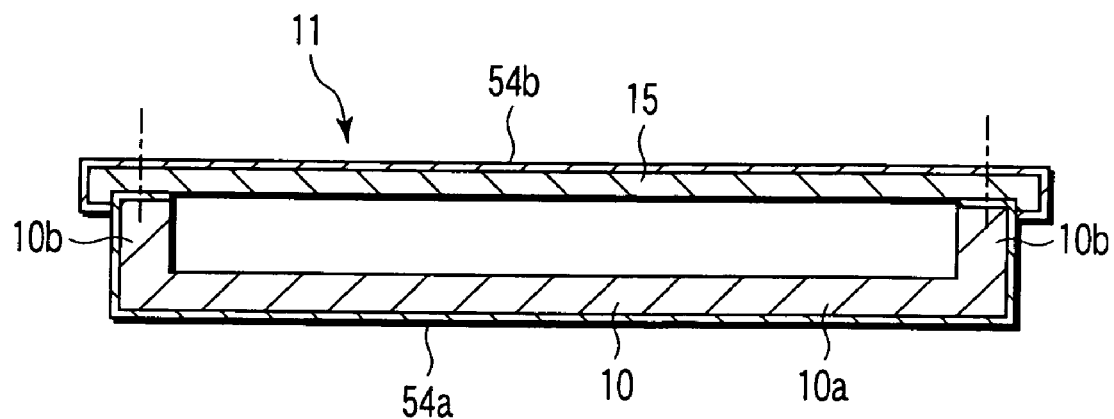
FIG. 6 is an exemplary sectional view schematically showing a case of an HDD according to a third embodiment of the present invention.

As shown in FIG. 6, according to a third embodiment, the first plating layer 54a is formed only on the outer surface of the base 10 to the thickness of 2t1. The second plating layer 54b is formed only on the outer surface of the top cover 15 to the thickness of 2t2. The first plating layer 54a and the second plating layer 54b are in contact with each other on the outer surface of a side wall 19b and made magnetically conducive with each other.

The third embodiment can also obtain the same operation/working effect as the second embodiment described above. Note that since the other arrangement of the second and third embodiments is the same as the first embodiment described above, the same portions are denoted by the same reference numerals and the detailed description thereof will be omitted.

Figure 7:
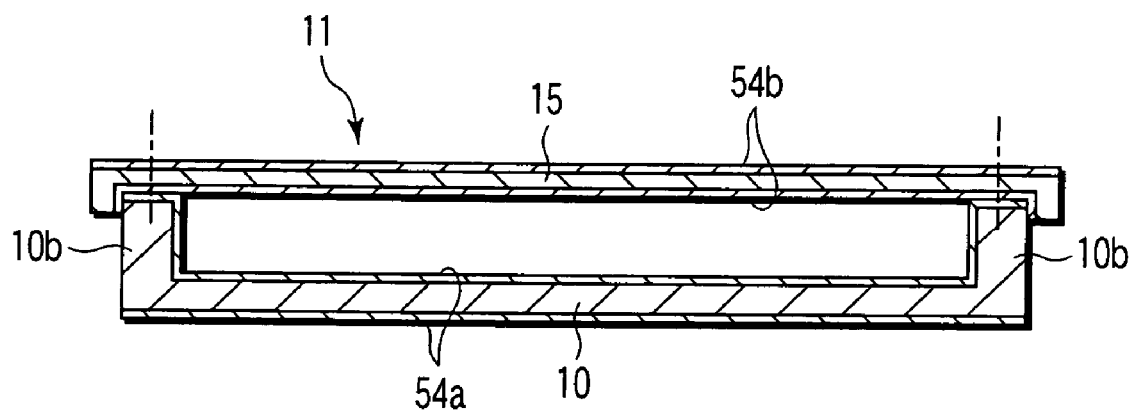
FIG. 7 is an exemplary sectional view schematically showing a case of an HDD according to a fourth embodiment of the present invention.

The first and second plating layers 54a, 54b are not limited to the arrangement for forming the closed loop and may form an approximately U-shaped loop with one end opened as in a fourth embodiment shown in FIG. 7. That is, the first plating layer 54a covers almost all the portions of the inner surface and the outer surface of the base 10 and a part of the outer surface of the side surfaces 10b is omitted. Further, the second plating layer 54b covers almost all the portions of the inner surface and the outer surface of the top cover 15 and is omitted in a part of the side edges.

It is possible also in this arrangement to obtain the magnetic shield effect by covering the magnetic disk, the magnetic heads and the like disposed in the case 11 with the first and second plating layers.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the number of the magnetic disk is not limited to one and may be increased if necessary. Any non-magnetic material may be used as the material of the base and the top cover constituting the case, and synthetic resin and the like may be used. Further, any magnetic material may be used for the first and second plating layers, and it is not limited to iron and any other metal may be used.

What is claimed is:

1. A disk device comprising:
    a case having a plate-shaped base formed of a non-magnetic material and having an open upper surface, a plate-shaped top cover formed of a non-magnetic material and attached to the base to cover the open upper surface of the base, a first plating layer formed of a magnetic material and covering an outer surface of the base, and a second plating layer formed of a magnetic material, covering an outer surface of the top cover, and conductively connected to the first plating layer;
    a disk-shaped recording medium which is arranged in the case and which has a substrate, a soft magnetic backing layer formed on the substrate, and a magnetic recording layer formed so as to overlap the soft magnetic backing layer and having perpendicular magnetic anisotropy; and
    a mechanical unit including a head which performs information processing with respect to the recording medium, a head actuator supporting the head, and a drive motor which supports and rotates the recording medium and is disposed on the base.

2. The disk device according to claim 1, wherein the base and the top cover are formed of aluminum, magnesium, or synthetic resin.

3. The disk device according to claim 1, wherein the first and second plating layers are formed of iron.

4. The disk device according to claim 1, wherein the first and second plating layers form a magnetically closed loop for covering members to be shielded, which are disposed in the case.

5. The disk device according to claim 1, wherein:
    the base has an inner surface located on the top cover side and an outer surface exposed to the outside, and the top cover has an inner surface located on the base side and an outer surface exposed to the outside; and
    the first plating layer is formed to entirely cover at least one of the inner surface and the outer surface of the base, and the second plating layer is formed to entirely cover at least one of the inner surface and the outer surface of the top cover.

6. The disk device according to claim 1, wherein:
    the base has a bottom wall, a side wall standing along a peripheral edge of the bottom wall, a plurality of screw clamping portions disposed on the extended end of the side wall, and a plurality of abutment portions which abut against the top cover; and
    the top cover is supported on the extended end of the side wall, fastened to the screw clamping portions by screws, and abutting against the abutment portions, and the first and second plating layers come into contact with each other in the screw clamping portions and the abutment portions and are electrically conductive with each other.

7. The disk device according to claim 1, wherein the head has a main magnetic pole which applies a recording magnetic field to the recording medium, a return yoke to which a flux return path is formed, and a reproducing element which reads out a signal from the recording medium.

\* \* \* \* \*